United States Patent [19]

Hughes

[11] 4,122,412
[45] Oct. 24, 1978

[54] MAGNETO-OPTICALLY TUNED LASERS

[75] Inventor: Richard Swart Hughes, Ridgecrest, Calif.

[73] Assignee: The United States of America as represented by the Secretary of the Navy, Washington, D.C.

[21] Appl. No.: 788,168

[22] Filed: Apr. 18, 1977

[51] Int. Cl.² ............................................. H01S 3/10
[52] U.S. Cl. ............................. 331/94.5 C; 350/355
[58] Field of Search .................... 331/94.5 C, 94.5 M, 331/94.5 K; 350/160 R, 96 WG, 358, 355

[56] References Cited

U.S. PATENT DOCUMENTS

| | | | |
|---|---|---|---|
| 3,817,597 | 6/1974 | Aleksoff | 331/94.5 K |
| 3,953,109 | 4/1976 | Kumada | 350/160 R |
| 3,990,776 | 11/1976 | Tseng et al. | 350/96 WG |
| 3,991,383 | 11/1976 | Hughes | 350/160 R |
| 3,996,525 | 12/1976 | Hughes et al. | 331/94.5 C |
| 4,032,216 | 6/1977 | Henry | 350/96 WG |

Primary Examiner—William L. Sikes
Attorney, Agent, or Firm—R. S. Sciascia; Roy Miller; K. G. Pritchard

[57] ABSTRACT

Stripe-domain light deflectors are used within a lasing cavity. Magnetic control of the deflectors permits tuning of the laser light to any wavelength in the range of light present.

6 Claims, 5 Drawing Figures

MAGNETO-OPTICALLY TUNED LASERS

BACKGROUND OF THE INVENTION

1. Field of the Invention

This invention relates to tunable lasers. Specifically it pertains to rapidly tunable lasers.

The increased use of lasers has led to interest in tunable lasers. The use of diffraction gratings and mechanical or electro-mechanical means are set forth in numerous prior art patents. However, all of these have been restricted due to limited deflection angle and thus narrow laser tuning range. Further limitations included relatively poor efficiency and moderate tuning rates.

As a relatively recent development stripe-domain light deflectors (SDLD) have been the subject of much experimentation. Stripe domains are ferromagnetic films with high Faraday rotation and low optical absorption which rotate the angle of polarization of light transmitted through (even-numbered domains) an angle $\phi = FT$ and through (odd-numbered domains) an amount $-\phi$, where F is the Faraday constant and T is the film thickness. The result of the differential rotation is that the film will act like a transmission diffraction grating. Since the orientation and spacing of the stripes may be altered by appropriate applied fields, the film may be used as a laser light deflector.

2. Description of the Prior Art

Studies by Johnsen, Hewitt, Kochel, and Torok on wide angle laser beam steering have provided insight into the effects of various materials for the stripe-domain material as well as methods and efficiencies of beam steering. All of this work was based on use of SDLD on the laser output.

SUMMARY OF THE INVENTION

This invention permits the rapid tuning of lasers. In particular, it uses stripe-domain light deflectors, SDLD, within the lasing cavity to tune the laser. The placing of SDLD in the cavity causes the laser to oscillate at the wavelength desired. The stripe-domain improves the range of wavelengths selectable by an order of magnitude over previous mechanical tuners and can be tuned at very rapid rates.

DESCRIPTION OF THE PREFERRED EMBODIMENTS

This invention is concerned with the effects of placing stripe-domain light deflecting SDLD, material in a lasing cavity.

Figure 1:
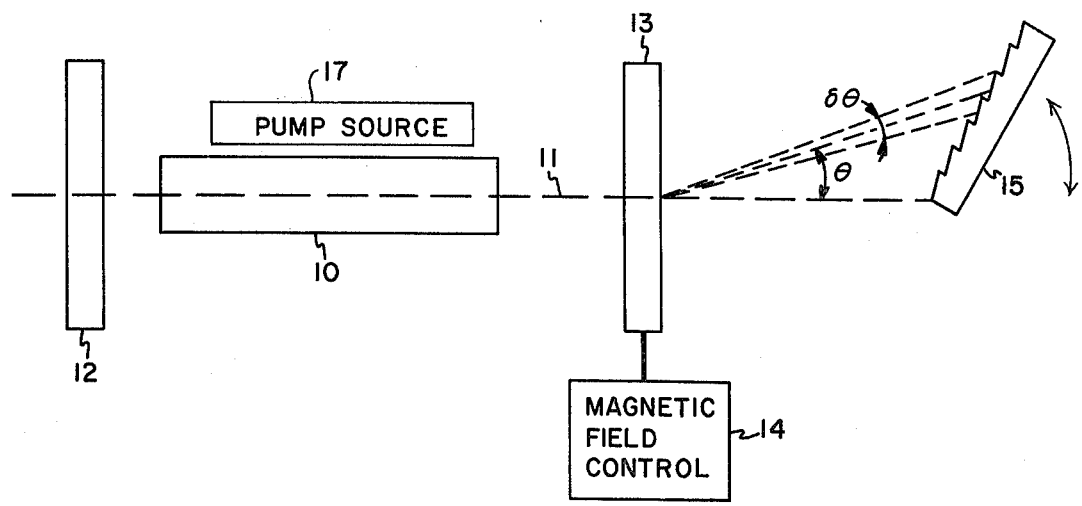
FIG. 1 is a physical layout of a SDLD tuned laser during a reflection diffraction grating and SDLD in a transmission state.

In FIG. 1 any lasing element 10 can be used. Lasing element 10 is driven to emit light by a pump source 17. Many lasers emit a band of wavelengths or a set of spectral lines. This is particularly true of organic dye lasers. The versatility and usefulness of such lasers is enhanced if they can be tuned to narrow bands which can be selectively varied.

The laser 10 emits light along an optical path 11. At one end of this path an output mirror 12 is placed. The percent of incident light transmitted can be varied in any desired amount by changing among such mirrors as are known in the art. The other end of optical path 11 is bounded by a total reflection mirror, shown in FIG. 1 as a reflection diffraction grating 15. The resonant cavity is between these mirrors.

On the opposite side of the lasing element from mirror 12 a SDLD device 13 is placed in the optical path. Light traveling along path 11 incident to SDLD 13 is transmitted through from either direction. Attached to SDLD 13 is magnetic field control 14 for varying the field. The light is deflected through the Bragg Angle $\theta$ when it is transmitted through the SDLD. This is due to the light being parallel or antiparallel to the SDLD magnetization and the resultant periodic differential Faraday rotation. A periodic phase difference of 180° in the electric field vector is produced which in the far field adds constructively at angles $\theta$ which satisfy $$\mathrm{SIN}\ \theta = n\eta\lambda/2d,$$

where:
 $d$ = domain width;
 $\lambda$ = light beam wavelength; and
 $\eta$ = diffraction order ($\eta = 0,1,3,...$)

It is clear from the equation that each wavelength is transmitted at a different angle. The band of wavelengths emitted are spread through an angle $\delta\theta$ as shown in FIG. 1. Since $d$ is controllable and inversely proportional to the deflection angle $\theta$, the deflection angle can be scanned by varying the magnetic field. The scanning rate of a SDLD is limited to the rate at which the stripe-domains can be altered.

Figure 2:
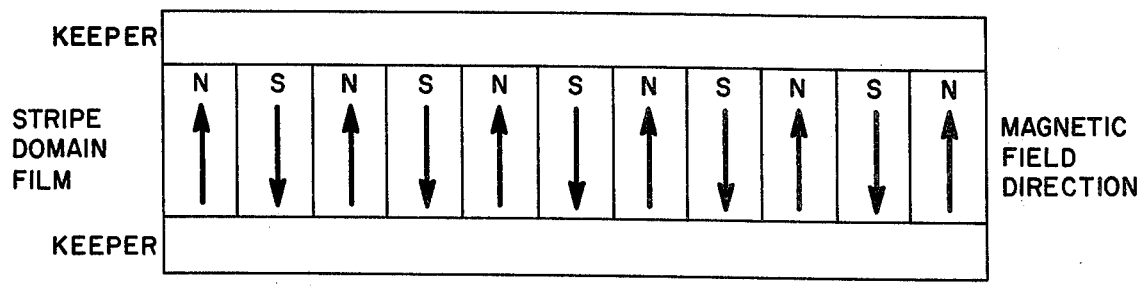
FIG. 2 is a drawing of the magnetic field orientation in SDLD.

The orientation of magnetic fields in SDLD is shown in FIG. 2 along with keepers to aid the magnetic fields.

After deflection, light traveling to the right in FIG. 1 strikes reflection diffraction grating 15 such as a blazed grating. Such gratings can select a particular wavelength for lasing. Grating 15 is oriented so that only the wavelength of interest reflects back along its original path. Grating 15 is mounted to be adjustable by any well known method. Grating 15 tilts in the direction shown by arrow 16. The combined adjustment of grating 15 and variation of the magnetic field in SDLD 13 allows the laser to be tunable over large ranges.

Figure 3:
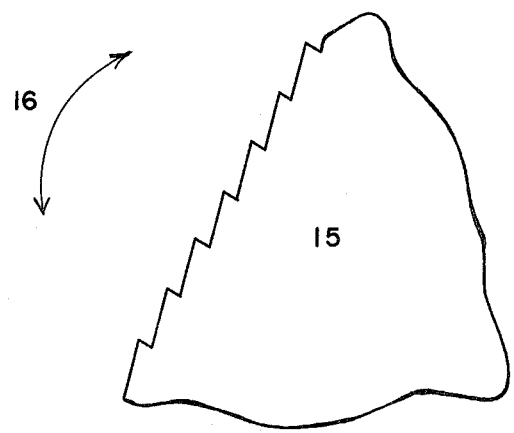
FIG. 3 is a close-up view of a blazed reflection diffraction grating.

FIG. 3 is a close up of a blazed grating surface. Information on such gratings is readily available in the art. Commercial gratings suitable for use in the invention are available.

Figure 4:
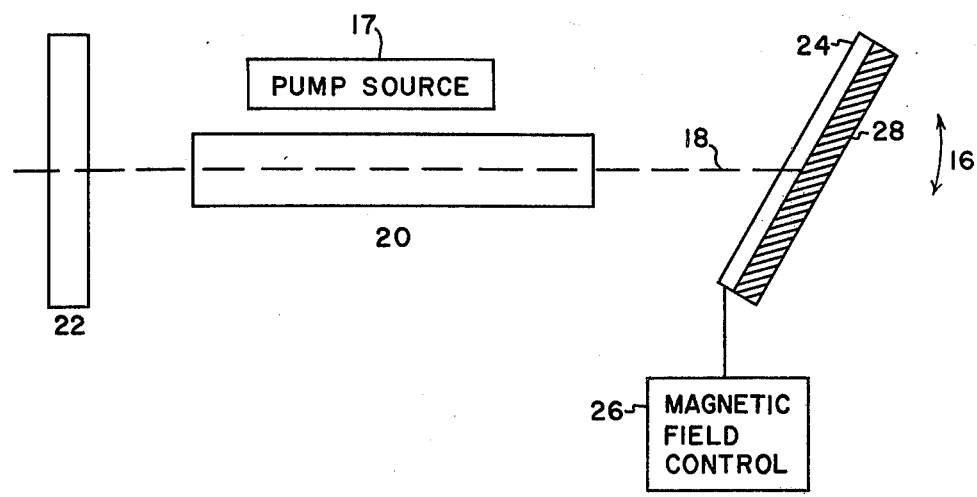
FIG. 4 is a physical layout of a SDLD tuned laser using the SDLD in a reflective state by silvering its back.

Another method of positioning a SDLD within a laser cavity is shown in FIG. 4. Lasing element 20 which can be any lasing material just as element 10 in FIG. 1, defines an optical path 18 on its axis. One end of the path is defined by output mirror 22. Again, mirror 22 is subject to any desired reflectivity-transmission ratio available. SDLD 24 is subject to field control 26 and against 100% reflective backing 28. This is probably a silvered backing, but other material with similar reflective properties are acceptable.

By rotating the SDLD and varying the magnetic field the cavity will only lase at predetermined wavelengths. Nondesired wavelengths will not reflect back on the optical path.

Figure 5:
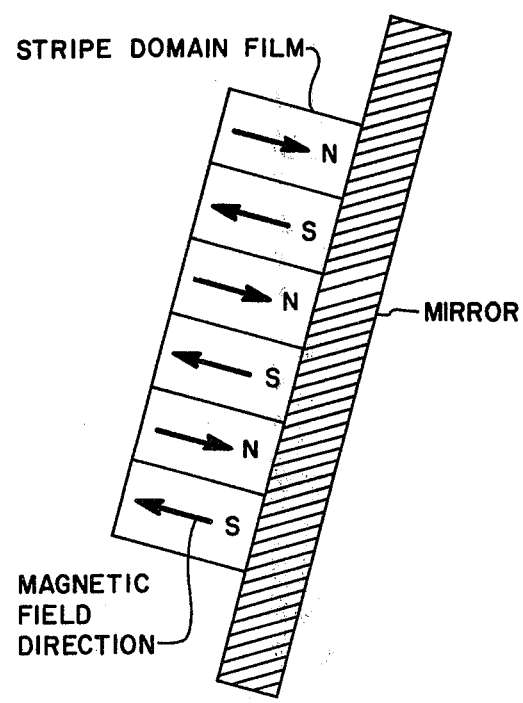
FIG. 5 is a close-up of a silver backed SDLD.

The positioning of stripe-domain film with mirror backing is shown in FIG. 5.

What is claimed is:

1. A rapidly tunable monochromatic laser comprising:
   a resonant cavity with a total reflection end and a partially reflective end so as to define an optical path between said ends;
   a lasing element with an axis which is placed in said resonant cavity such that said axis is along said optical path for emitting predetemined light waves along said axis;
   a pump source in proximity to said lasing element for driving said lasing element to emit light;
   a stripe-domain light deflector, SDLD, located in the optical path between said lasing element and said total reflection end for directing said emitting light by interaction with the magnetic field in said SDLD as it passes through said SDLD; and
   electrical means operatively attached to said SDLD for varying said magnetic field of said SDLD so as to tune said emitted light.

2. A rapidly tunable monochromatic laser as defined in claim 1 wherein the total reflection end is an adjustable diffraction reflection grating.

3. A rapidly tunable monochromatic laser as defined in claim 2 wherein said adjustable diffraction reflection grating is a blazed grating.

4. A rapidly tunable monochromatic laser as described in claim 1 where the lasing element is an organic dye.

5. A rapidly tunable monochromatic laser comprising:
   a resonant cavity with a partially reflective end and an adjustable total reflection end so as to define an optical path between said ends;
   a lasing element with an axis which is placed in said resonant cavity such that said axis is along said optical path for emitting predetermined light waves along said axis;
   a pump source in proximity to said lasing element for driving said lasing element to emit light;
   a strip-domain light deflector mounted on the resonant cavity side of said total reflection end for directing said emitted light by interaction with the magnetic field in said SDLD as said emitted light passes through said SDLD so that combined deflection of light by the magnetic field and the orientaton of said adjustable total reflection end cause a predetermined wavelength to resonate; and
   electrical means operatively attached to said SDLD for varying said magnetic field of said SDLD so as to tune said emitted light.

6. A rapidly tunable monochromatic laser as defined in claim 5 wherein the lasing element is an organic dye.

* * * * *